F. M. RAY.
Making India Rubber Cylinders, &c.
No. 7,251.
Patented April 2, 1850.
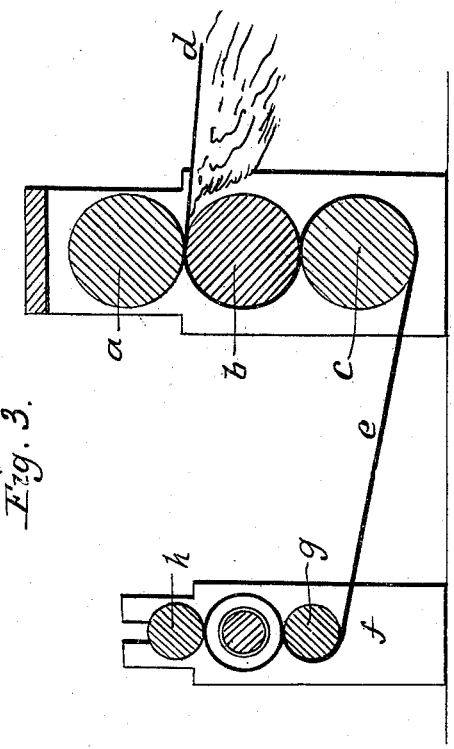
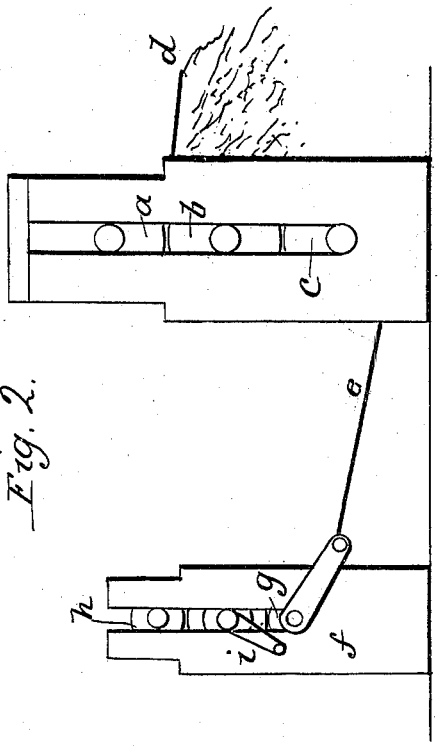
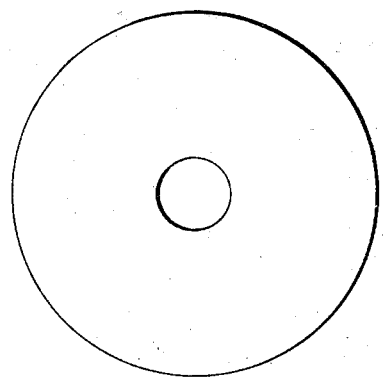

UNITED STATES PATENT OFFICE.

FOWLER M. RAY, OF NEW YORK, N. Y.

MANUFACTURE OF INDIA-RUBBER SPRINGS FOR CARS, &c.

Specification of Letters Patent No. 7,251, dated April 2, 1850.

*To all whom it may concern:*

Be it known that I, FOWLER M. RAY, of the city, county, and State of New York, have invented a new and useful Improvement in the Method of Making Cylinders or Rolls of Metallic or Vulcanized India-Rubber, Principally Intended for India-Rubber Springs for Railroad-Cars, and that the following is a full, clear, and exact description of the principle or character which distinguishes my invention from all other things before known and of the method of making, constructing, and using the same, reference being had to the accompanying drawings, making part of this specification, in which—

Figure 1, represents a cylinder of india rubber completely formed. Fig. 2, a side elevation, and Fig. 3, a longitudinal vertical section of the machine for making such cylinders.

The same letters indicate like parts in all the figures.

The methods heretofore practiced for making cylinders or rolls of metallic or vulcanized india rubber are, either to take the required quantity of metallic rubber in the green state, as it is termed, and in lumps, and press it into molds of the required size and form, or to roll onto a strip of cloth of the required length and breadth, one after another, a series of thin sheets of such rubber, while in the green state, until a sufficient thickness, say one eighth of an inch, has been obtained, then to strip off the cloth and roll up into the cylindrical form and size required the sheet of india rubber thus obtained. The practical objections to the first of these methods are the great cost of the molds and the difficulty of obtaining an equally compact and solid mass, so important particularly in the making of railroad car springs, for the elasticity and yielding property of this material, while in the green state, often prevents the cementation or perfect union of the surfaces of the pieces constituting the whole mass. And the objection to the second is the difficulty of uniting the surfaces in rolling up the sheet, for in forming the sheet of india rubber on a strip of cloth, and then stripping off the cloth, the india rubber cools and loses much of its adhesive quality, and as it requires much handling and must be flowered for that purpose, the surfaces of the sheet in rolling up to make the cylinder can only be made to adhere by the use of india rubber cement, and even with such cement the union is frequently imperfect.

The object of my invention is to avoid the objections to the two methods above specified, and at the same time to produce cylinders or rolls of prepared india rubber at less cost, and to this end.

The nature of the first part of my invention consists in rolling up on a mandrel and under pressure a thin sheet or sheets of metallic india rubber, while in the green and heated state, until the required diameter has been obtained. And the second part of my invention consists in combining with the usual heated calendering rollers used in the manufacture of metallic india rubber, a mandrel on which the said sheet of india rubber is wound, as it comes from the heated calendering rollers, the said mandrel being made to bear and turn on the surface of a cylinder below.

In the accompanying drawings (*a, b, c*) represent the calendering rollers, mounted, heated and operated in the usual manner employed in the manufacture of metallic rubber, and (*d*) represents a mass of india rubber, prepared in the manner of Goodyear's metallic rubber, but before the same has been cured by baking. This mass of india rubber in passing between the calendering rollers is reduced to a thin sheet (*e*) which is taken to and wrapped around a cylindrical rod called a mandrel, which rod should be previously wrapped round with a piece of cloth. The ends of this rod or mandrel are formed into journals which turn freely between the standards (*f, f*,) of the frame so that it shall be free to rise and fall. This mandrel rests and rolls upon the periphery of a cylinder (*g*) which has its bearings in the said standards of the frame, and the pressure is effected either by means of a weighted roller (*h*) which bears on the mandrel, or by spring strips (*i, i,*) of india rubber, attached to the frame and passing round the journals of the mandrel; one of which journals should be provided with a winch or crank handle, by means of which an attendant winds up onto the mandrel the thin sheet of india rubber as it comes from the calender cylinder in a warm and adhesive state. When the required diameter has been obtained, the sheet is cut off, the mandrel removed, and another mandrel put into the machine to form another cylinder or roll. The cylinders or rolls are then put into an oven and cured in the usual way, known as Goodyear's method of curing prepared india rubber. After the curing process, if such cylinders or rolls are intended for rail-road car springs, the mandrel is mounted in a lathe and the ends cut off or turned off, and the whole cut into pieces of the required lengths, which is done by means of a thin knife-like cutter kept wet with water.

What I claim as my invention and desire to secure by Letters Patents is—

1. The method of making cylinders or rolls of prepared india rubber by rolling up a thin sheet of prepared india rubber on a mandrel while the said sheet is in a green state, and as it comes from the heated calendering cylinders, substantially as described.

2. And I also claim as my invention in combination with the calendering cylinders, such as are usually employed in the manufacture of prepared india rubber, a mandrel or cylindrical rod pressed against the periphery of a cylinder or roller, so that the thin sheet of prepared rubber, in the green state and taken as it comes from the calendering cylinders, may be wound up on the mandrel, and the several windings made to adhere by pressure, substantially as described.

FOWLER M. RAY.

Witnesses:
ALEX. PORTER BRONELL,
CAUSU BROWNE.